Jan. 5, 1965　　　M. PLEASURE　　　3,164,779
FREQUENCY TRANSDUCER
Filed May 6, 1960　　　　　　　　2 Sheets-Sheet 1

*INVENTOR.*
MYRON PLEASURE
BY
*John J. Rogan*
ATTORNEY

United States Patent Office 3,164,779
Patented Jan. 5, 1965

3,164,779
FREQUENCY TRANSDUCER
Myron Pleasure, Jackson Heights, N.Y., assignor to Litton Systems, Inc., a corporation of Maryland
Filed May 6, 1960, Ser. No. 27,393
15 Claims. (Cl. 329—137)

This invention relates to frequency discriminators or transducers and more particularly it relates to systems for translating frequency-modulated, phase-modulated or angle-modulated input signals into corresponding output signals.

A principal object of the invention is to provide an improved frequency, phase, or angle modulation discriminator or detector.

Another principal object is to provide an improved discriminator of the generic phase detection kind.

A feature of the invention relates to a frequency discriminator or detector of the phase detection kind employing a pair of coils which are coupled by a tuning fork vibrator so as to produce in the output of the discriminator, voltages which vary with and correspond to the variation in frequency, phase, or angle modulation of input signals.

Another feature relates to a frequency discriminator or detector employing a pair of circuits, one having a primary inductance means which is energized by variable frequency input signals and the other having a secondary inductance means arranged to have two voltages developed thereacross, one of which leads the input voltage by approximately 90 degrees and the other of which lags the said input voltage by approximately 90 degrees, the said two inductance means being mutually coupled by a tuning fork vibrator to effect the necessary phase relations between the said two voltages.

A further feature relates to a discriminator or detector of the kind having primary and secondary inductances which are coupled for wave energy transfer from primary to secondary through a tuning fork vibrator, and wherein the said inductance means serve also as the driving and pick-up means for the feedback circuit for maintaining the fork in vibration.

A further feature relates to the novel organization, arrangement and relative location and interconnection of parts which cooperate to provide an improved discriminator or detector for frequency-modulated, phase-modulated or angle-modulated signals.

Other features and advantages not specifically enumerated will be apparent after a consideration of the following detailed descriptions and the appended claims.

Figure 1:
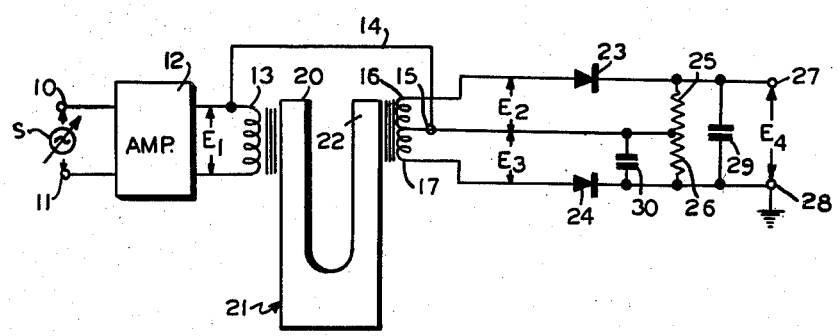
Figure 2:
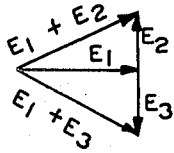
Figure 3:
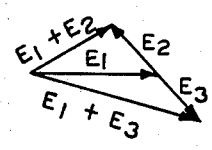
Figure 4:
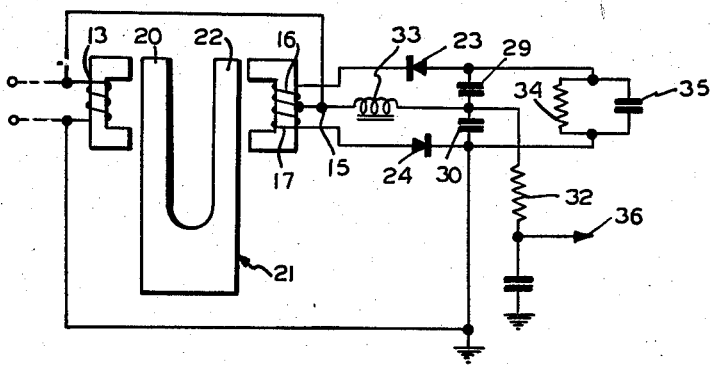
Figure 5:
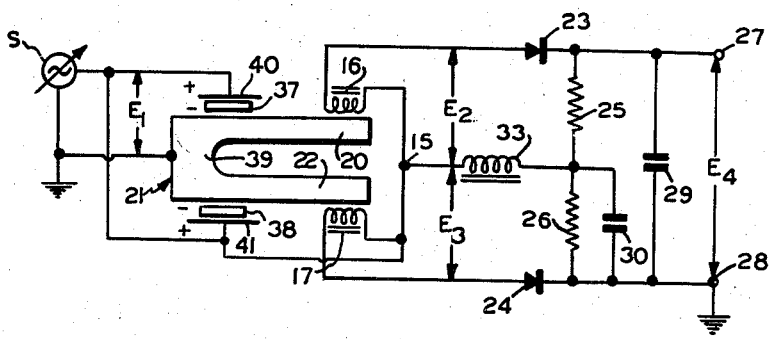
Figure 6:
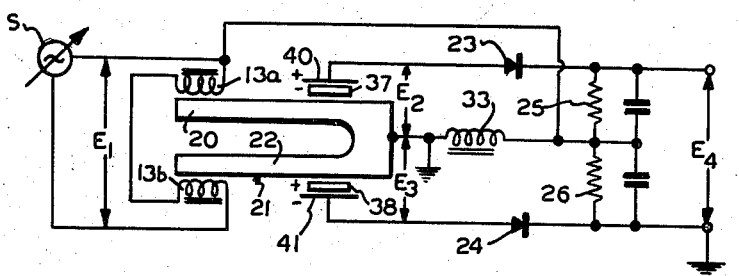

In the drawing,
FIG. 1 is a schematic diagram of a discriminator or frequency transducer according to the invention;
FIGS. 2 and 3 are respective vector diagrams explanatory of the invention;
FIG. 4 shows the invention embodied in a ratio-detector for frequency-modulated waves;
FIGS. 5 and 6 are respective modifications of the invention.

Referring to FIG. 1, there is shown any well known source S for producing an input signal in the form of a frequency-modulated, phase-modulated or angle-modulated voltage to be applied to the input terminals 10, 11. The input signals can be amplified in any suitable amplifier 12 for the input signals across whose output coil there is developed the frequency-modulated voltage $E_1$. The amplified signals are applied to coil 13 which is connected over conductor 14 to the junction point 15 between a pair of equal inductances 16, 17. For certain conditions coil 13 can be connected to inductances 16, 17 via a suitable coupling capacitor.

The coil 13 is mounted adjacent one of the prongs 20 of the fork 21 so as to act as a drive element for the fork; while the coils 16 and 17 are mounted adjacent the other fork tine 22 to act as a voltage pick-up from the fork. It will be understood of course, that the coil 13 may be wound on a suitable magnetic core to increase the electromagnetic driving effect. Likewise the coils 16, 17 may be mounted on a magnetic core to increase the magnetic pick-up effect. In accordance with the invention, the fork has a fundamental frequency which is approximately the same as the mid-frequency of the frequency range of the signals applied to winding 13. In other words, the fork 21 resonates at the said mid-frequency of the signals. If desired, the drive coil 13 and the pick-up coils 16 and 17 can be mounted at respective anti-nodal points of the fork tines so as to cause the fork to be driven at one of its higher partial modes as disclosed in my application Serial No. 22,212, filed April 14, 1960, now abandoned.

Thus, when the fork is driven by the signal energizations of coil 13, it causes to be developed across the coils 16, 17, two alternating or pulsating voltages $E_2$ and $E_3$, which voltages added to voltage $E_1$ are rectified in respective diodes 23, 24 and develop corresponding resultant direct current voltages across the load resistors 25, 26. The resultant direct current voltage $E_4$ thus appears at the output terminals 27, 28. Preferably, suitable by-pass condensers 29 and 30 may be connected as shown.

When the system of FIG. 1 is in resonance with the mid-frequency of the input signals, the voltage $E_2$ lags $E_1$ by 90 degrees; and $E_3$ leads $E_1$ by 90 degrees. Likewise $E_1+E_2$ equals $E_1+E_3$, as indicated in the vector diagram of FIG. 2. When the input frequency departs from resonance, voltage $E_2$ still equals $E_3$, but $E_1+E_2$ does not equal $E_1+E_3$, as indicated in the vector diagram of FIG. 3. Therefore, the diodes 23, 24 have different voltages applied thereto, and this produces the output direct current voltage $E_4$. It is clear then that this output voltage $E_4$ is caused by phase shift between the voltage $E_1$ and the current flowing in coil 13, as the frequency applied to terminals 10, 11 changes.

When the frequency of the input signal shifts or is varied above or below the said resonant frequency, the direct current ouptut voltage $E_3$ is obtained. That voltage is positive or negative depending upon the direction of frequency shift of the input signal with respect to the mid-frequency. The magnitude of $E_4$ also varies with the extent of said shift. If desired, by reversing the secondary windings 16, 17, or by reversing the connections to the respective diodes 23, 24, the polarity of $E_4$ can be reversed.

I have found that the coil 13, which receives the input signals, does not require any parallel or other capacitor tuning to bring it to resonance since the resonance effect in the primary circuit is achieved by the natural vibration of the fork tines. Likewise the secondary coils 16 and 17 are mounted adjacent the other fork tines so as to act as fork pick-up coils whereby the vibration of the fork tines induces into the coils 16 and 17 respective voltages $E_2$, $E_3$, and these coils do not require any parallel or other capacitor tuning. With this method of transferring the wave energy from the coil 13 to the coils 16 and 17, it is possible to have the voltage $E_2$ lag voltage $E_1$ by 90 degrees, and voltage $E_3$ lead voltage $E_1$ by 90 degrees when the mid-frequency of the signal input is in resonance with the natural period or any selected harmonic of the natural period or partial mode of vibration of the fork 21. At this resonant frequency the rectified output voltages from the diode rectifiers 23 and 24 cancel each other and produce zero or a predetermined minimum direct current voltage at the terminals 27, 28. However, when the input frequency varies from the base or middle frequency, the output voltage $E_4$ correspondingly varies.

I have found that by eliminating the direct mutual inductance coupling between coil 13 and coils 16, 17 and effecting the wave transfer by means of a tuning fork, much greater frequency stability of the discriminator is achieved, and greater sensitivity to small frequency input changes is also achieved. Furthermore, by this arrangement it is possible to utilize a fork 21 which is of extremely high frequency stability so as to render the discriminator substantially independent of or unaffected by ambient temperature and similar undesirable variations.

It will be understood, of course, that the fork 21 may be of any well known construction, a typical construction of fork having high degree of temperature stability being that given in U.S. Patent No. 2,469,951. It also will be understood that the fork 21 can be replaced by any equivalent electromechanical vibratory member having a predetermined natural mechanical resonant frequency, and which can be driven or maintained in vibration by the coil 13 and which induces corresponding voltage variations in the coils 16 and 17.

The invention is also applicable as a frequency discriminator of the ratio detector kind. Such an arrangement is shown schematically in FIG. 4, wherein the elements corresponding to those in FIG. 1 bear the same designation numerals. In FIG. 4, one of the diodes 23, 24 is reversely connected as compared with their connection in FIG. 1. The mid-point 15 between the coils 16 and 17 is connected through the output load resistor 32 through a choke inductance 33 to enable the alternating current potentials from the coils 16 and 17 to be applied across the diodes 23, 24 in phase, while providing a direct current return from each diode without short circuiting the applied alternating current potentials. In order to provide the necessary reference voltage a relatively large capacitance 35 is provided which is shunted by a suitable resistance 34 so that the voltage stored in said capacitance 35 equals the sum of the two rectified direct current potentials from the two diodes. In other words, the sum of the two diode output potentials must remain equal to the constant potential to which capacitor 35 is charged. However, the ratio of the two rectified potentials across the two smaller capacitors 29, 30 changes as the input frequency is varied. The detected output therefore appears at the output terminal 36. Here again, by using the tuning fork, the necessity of tuning the input coil 13 and the output coils 16 and 17 by separate capacitor and the like, is avoided, and a more stable and efficient frequency discriminator or ratio detector is thus provided.

While in the foregoing the fork drive and fork pickup elements are referred to as of the electromagnetic kind, other kinds of drive and pick-up elements may be used. Thus, as shown in FIG. 5, the fork is driven by one or more piezoelectric elements 37, 38, which can be cemented or otherwise fastened to the fork preferably adjacent the heel portion 39 thereof. The pick-up coils 16, 17 can be mounted adjacent the fork tines to produce the $E_2$ and $E_3$ voltage components as described hereinabove. Since the piezoelectric elements 37, 38 are cemented or fastened directly to the fork surface, the fork can constitute one of the piezoelectric electrodes. The remaining piezoelectric electrodes 40, 41 can be connected in like phase to one of the input terminals of the source S. The other terminal of the source can be grounded and connected to the fork. The operation of the system in producing output voltages $E_4$ corresponding to the frequency variations of source S is otherwise the same as described above in connection with FIG. 1.

Instead of employing the piezoelectric elements to drive the fork, they may be used as the pick-up elements. Such an arrangement is shown in FIG. 6 wherein the input source S of frequency-modulated voltages are applied to the coils 13a, 13b to drive the fork 21. The piezoelectric pick-up elements 37, 38 have developed across them the respective voltage components $E_2$, $E_3$. It will be observed that in the embodiment of FIG. 6 the electrodes 40, 41 of the piezoelectric pick-up elements are excited in opposite phase, as indicated by the respective polarity markings in FIG. 6. In this case the source S is connected to the driving coils 13a, 13b in series and the fork 21 is grounded as indicated, and the electrodes 40, 41 are oppositely excited in phase.

It also will be understood, of course, that the use of coils and piezoelectric elements to drive the fork may also be applied when the system is used as a ratio detector such as illustrated in FIG. 4.

Various changes and modifications may be made in the disclosed embodiments without departing from the spirit and scope of the invention.

What is claimed is:

1. A frequency discriminator for producing an output correlated with a variable frequency input, comprising an input inductance, another inductance consisting of two series coils, means for developing across said other inductance two voltage components which respectively lead and lag in phase the voltage across said input inductance, means to rectify said two voltage components to produce a resultant output correlated with the said variable frequency input, and said means for developing said two components including a mechanically resonant device said device being coupled to said input inductance so as to be driven thereby, and said device being coupled to said other inductance to induce said two voltage components therein.

2. a frequency discriminator comprising primary and two secondary coils, means including a mechanically resonant vibratory member for transferring wave energy from said primary coil to said secondary coils to develop across said secondary coils two out-of-phase voltage components, rectifier means for said components, and means to combine the rectified voltages to produce a varying current output correlated with the frequency of signals impressed upon said primary coil.

3. A frequency discriminator, comprising primary coil means, secondary coil means, a tuning fork in mutual inductive relation to said coil means for transferring wave energy from said primary coil means to said secondary coil means, said secondary coil means having two sections across which are developed in response to the fork vibration two voltage components one leading the voltage across the primary coil by approximately 90 degrees and the other lagging the voltage across the primary coil by approximately 90 degrees, means to rectify the said components and means including a voltage combining network for the rectified components for producing a predetermined minimum direct current voltage at the output of the discriminator when signals applied to said primary coil are in substantial resonance with a predetermined frequency component of said fork vibration.

4. A frequency discriminator according to claim 3 in which said primary coil means is coupled to the fork to act as a fork drive element, and said secondary coil means is coupled to said fork to act as a fork pick-up means.

5. A frequency discriminator for converting variable frequencies into corresponding signal voltages, comprising an input device arranged to be energized by input signals whose frequencies vary with respect to a base frequency, another device across which are to be developed under control of said input signals two voltage components which respectively lead and lag the phase of the input signals by approximately 90 degrees at said base frequency, and a tuning fork for coupling said devices for wave energy transfer therebetween said fork having a vibratory part in energy transferring relation to each of said devices.

6. A frequency discriminator according to claim 5 in which the first device constitutes the fork driving means, and the other device constitutes the fork pick-up means.

7. In a alternating-to-direct current signal converter, a variable frequency input device, a tuning fork, means coupling said input device to one of the fork tines to drive the fork, fork pick-up means coupled to one of the other fork tines and arranged to develop two voltage components which respectively lead and lag the phase of the voltages at the input device by approximately 90 degrees and a voltage and combining network for rectifying said components to produce voltages whose amplitude and polarity are correlated with the variations in frequency of said variable frequency input device with respect to a given base frequency.

8. A transducer for converting a variable frequency input into corresponding demodulated signal voltages, comprising a tuning fork, tuning fork drive means, tuning fork pick-up means, said tuning fork serving as the mutual coupling between said drive and pick-up means, said drive means arranged to be excited by variable frequency input signals and to maintain said fork in vibration, means to produce at said pick-up means two voltage components which vary in phase with respect to the input signals depending upon their frequency, and a rectifier and voltage combining network connected to said drive and pick-up means to produce an output voltage corresponding to the variation of frequency of the input signals from a given base frequency.

9. A transducer according to claim 8 in which said fork has a natural period of vibration correlated with the said base frequency of the said input signals.

10. A transducer for converting variable frequency input signals into corresponding direct current output voltages, comprising a tuning fork input and output coils respectively coupled to said tuning fork, said tuning fork being driven by the input coil for transferring wave energy to said output coil and means connected to said coils to develop a minimum direct current output voltage at the input signal frequency coinciding with the resonant frequency of the fork.

11. A frequency discriminator for modulated waves such as frequency-modulated, phase-modulated or angle-modulated waves, comprising first inductance means arranged to be energized by the said waves, second inductance means, a mechanically resonant device, said first inductance means being mounted adjacent said device to act as a drive element therefor, the second inductance means being mounted adjacent said device to act as a pick-up from said device, said device having a natural period of vibration means including both said inductance means to produce voltage components which vary with changes in the frequency or phase of the input waves, rectifier means to rectify said components, and an integrating device to which said rectified components are applied to develop a direct current output voltage whose magnitude varies in accordance with the departure of said waves from said period of vibration.

12. A frequency discriminator according to claim 11 in which said mechanically resonant device is a tuning fork and said inductance means are mounted in respective driving and pick-up relation with the fork tines.

13. A frequency discriminator for producing an output correlated with variable frequency input signals, comprising a mechanically resonant device, driving means for said device, pick-up means for said device consisting of two series coils, means to excite said driving means from a source of variable frequency input signals to develop at said pick-up means two voltage components which respectively lead and lag the phase of the input signals by angles depending upon the frequency thereof, and a voltage rectifying and combining network for rectifying said components to produce output voltages whose amplitude and polarity are correlated with the variations in frequency of said input signals with respect to a given base frequency.

14. A frequency discriminator according to claim 13 in which said driving means is of the piezoelectric kind.

15. A frequency discriminator according to claim 13 in which said pick-up means is of the piezoelectric kind.

References Cited in the file of this patent
UNITED STATES PATENTS

| | | |
|---|---|---|
| Re. 22,996 | Crosby | Apr. 27, 1948 |
| 1,821,181 | Gunn | Sept. 1, 1931 |
| 2,243,702 | Hansell | May 27, 1941 |
| 2,405,656 | Knopp | Aug. 13, 1946 |
| 2,469,785 | Reiber | May 10, 1949 |
| 2,755,442 | Sherwood et al. | July 17, 1956 |
| 2,840,640 | Babcock | June 24, 1958 |
| 2,914,672 | Powell | Nov. 24, 1959 |
| 2,977,537 | Wible | Mar. 28, 1961 |

UNITED STATES PATENT OFFICE
CERTIFICATE OF CORRECTION

Patent No. 3,164,779                            January 5, 1965

Myron Pleasure

It is hereby certified that error appears in the above numbered patent requiring correction and that the said Letters Patent should read as corrected below.

Column 2, line 43, for "ouptut voltage $E_3$" read -- output voltage $E_4$ --; column 4, line 29, for "a" read -- A --; column 5, lines 7 and 8, strike out "rectifying" and insert the same after "voltage" in line 7, same column 5; column 6, line 2, after "vibration" insert a comma.

Signed and sealed this 4th day of May 1965.

(SEAL)
Attest:

ERNEST W. SWIDER                            EDWARD J. BRENNER
Attesting Officer                               Commissioner of Patents